Patented Aug. 10, 1937

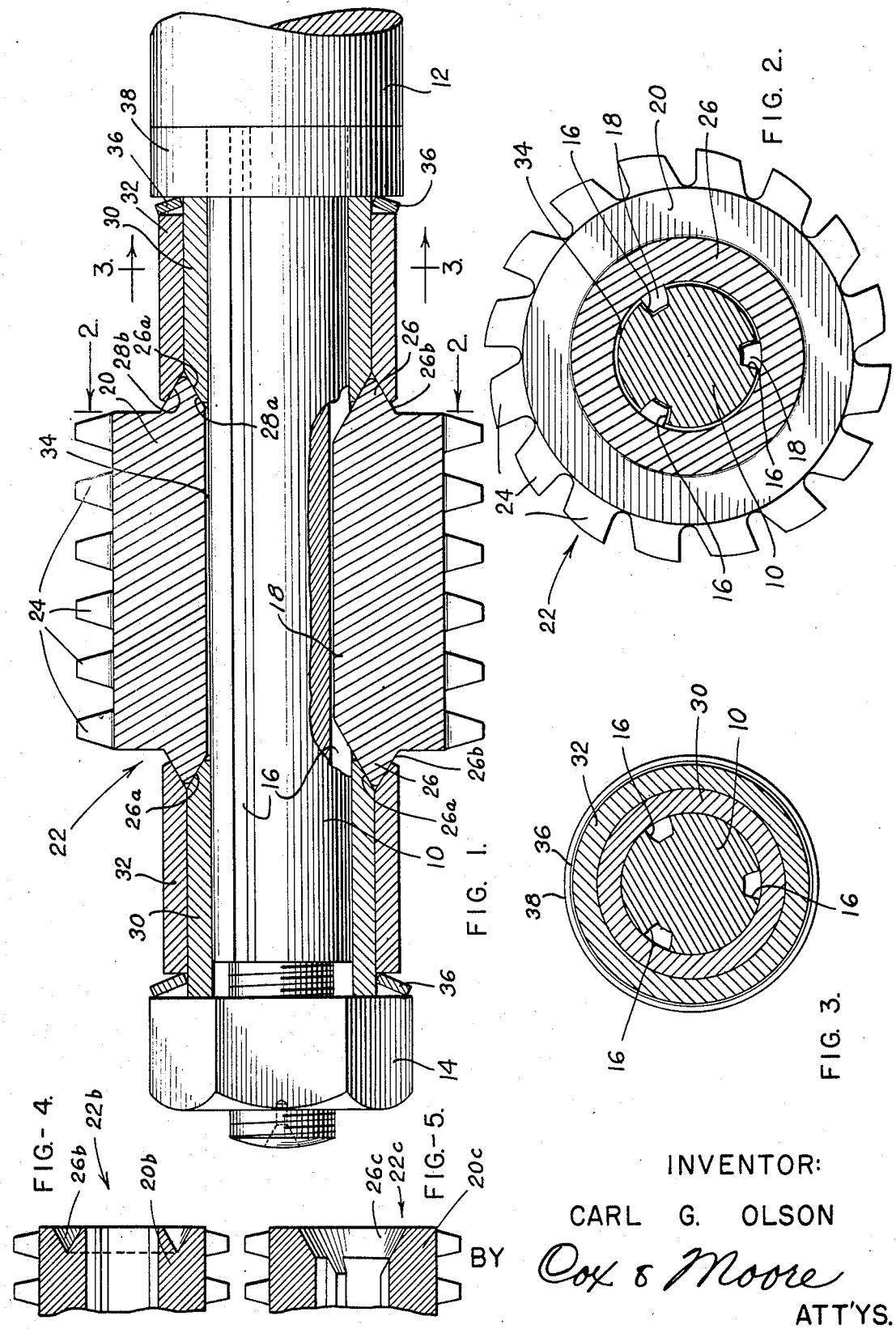

2,089,410

UNITED STATES PATENT OFFICE 2,089,410

MOUNTING AND DRIVING MEANS FOR CUTTERS

Carl G. Olson, Chicago, Ill., assignor to Illinois Tool Works, Chicago, Ill., a corporation of Illinois Application September 29, 1933, Serial No. 691,433

5 Claims. (Cl. 287—53)

This invention relates generally to mountings and driving means for cutters, and more particularly to improvements in means for supporting a cutter on a tool driving arbor.

Considerable difficulty has been experienced in the past in connection with the mounting of cutters, for example, hobbing cutters, thread milling cutters, and form cutters in general upon machine arbors. Obviously such cutters will generate or reproduce their form only when mounted to run perfectly true about the axis on which they were rotated when made in the shop. That is to say, such cutters will generate or reproduce their form accurately provided that, when they are mounted upon a machine, they rotate perfectly true about a given axis, and this axis must be coincident with the axis about which the cutter blanks were rotated when the teeth were produced thereon. In practicing conventional methods of procedure, it requires that the arbors on which the cutters are to be used, must be perfect in size, and that the holes in all cutters to be used on such arbors are all alike and have a perfect fit on the arbor, and, further, that the holes have exactly the same and correct diameter at both ends. When it is understood that the dimensions referred to above are measured in fractions of thousandths of an inch, it will be apparent that this procedure in the shop becomes a very tedious accomplishment and introduces an element of expense in the production of tools. The matter of increase in the expense of production will be more fully appreciated when it is understood that if the holes in the cutters become oversize in the process of making them, there is no practical method of remedying this condition, except by making a new cutter. This difficulty has been the cause for considerable scrap in the cutter shop, and frequently becomes very costly.

The primary object of the present invention is to overcome the above mentioned and other difficulties heretofore experienced, and to this end I propose to provide an improved mounting arrangement for cutters, one embodiment of which includes the provision of conical surfaces on a rotary body, which coact with companion conical surfaces on the arbor structure or support to thereby facilitate the accurate mounting of a cutter.

More specifically, my invention contemplates the provision of a device including an arbor having a plurality of axially extending locking elements, which interlock with companion elements provided along the inner periphery of a rotary body in combination with means in the form of conical supporting surfaces adapted to receive companion conical surfaces provided at opposite extremities of said rotary body.

Still more specifically, my invention contemplates the provision of a cutter support designed to receive bearing surfaces provided along protuberances extending axially from each end of a rotary body.

A further and more specific object of the invention is to provide a device, as above set forth, wherein a pair of companion sleeve members positioned at one side of a rotary body cooperate with a pair of companion sleeve members at the opposite side of said body to support a cutter structure by engaging annular surfaces accurately positioned at each end of the body.

The foregoing and numerous other objects and advantages will be more apparent from the following detailed description when considered in connection with the accompanying drawing, wherein—

Figure 1 is a central longitudinal sectional view of a supporting device of my improved construction disclosed in operative association with a cutter body, the arbor proper being shown in elevation;

Figure 2 is a transverse sectional view taken along the line 2—2 of Figure 1;

Figure 3 is a transverse sectional view taken along the line 3—3 of Figure 1;

Figure 4 discloses a fragmentary portion in section of a modified recess arrangement for the body; and Figure 5 is a further modification of the recessed body.

Referring now to the drawing more in detail wherein like numerals have been employed to designate similar parts throughout the various figures, it will be seen that one embodiment of my invention includes an arbor 10, which extends from a suitable arbor support 12. The free end of the arbor 10 is reduced and threaded to receive a suitable clamping nut 14, and a plurality of equally spaced keyways 16 (three in number as shown) extend longitudinally of said arbor. These keyways 16 are adapted to interlock with complementary keys 18 provided along and extending inwardly from a rotary body 20.

In the present embodiment, the body 20 forms an integral part of a milling cutter, which I have designated generally by the numeral 22, and this cutter includes a plurality of teeth 24 formed integral with the body 20. Obviously the rotary body 20 may be formed independently of the cutter portion proper, and hence the present invention does not contemplate any particular cutter tooth structure, but does include the combination of a rotary body, such as the cutter body 20 shown herein with cooperating elements for accurately maintaining said rotary body in position. Extending axially from each end of the rotary body 20 is an annular protuberance 26, which is substantially V-shaped in cross-section so as to present inner and outer conical bearing surfaces 26a and 26b, respectively. These bearing surfaces 26a and 26b provided on the annular protuberance or hub 26 are ground so as to receive complementary ground surfaces 28a and 28b formed at the inner ends of concentric sleeves 30 and 32, respectively.

The sleeves 30 are accurately and slidably fitted on the arbor 10, and each of the sleeves 32 is accurately and slidably fitted upon the complementary sleeve 30. It will be noted that the central opening or hole 34 within the rotary body 20 is larger in diameter than the diameter of the arbor 10, and hence, when the nut 14 is tightened against the outermost sleeve 30, the complementary conical bearing surfaces 28a and 26a coact to provide the internal support for the rotary body. This is to be distinguished from conventional cutter mounting structures, wherein the rotary body is mounted directly upon the peripheral surface of an arbor. The sleeves 32 are urged toward the body 20 so as to maintain bearing relationship between the conical surfaces 26b and 28b by means of spring washers 36. A suitable spacing collar 38 is interposed between the inner washer and the arbor support 12. Obviously any number or size of collars may be employed, depending upon the length of the rotary body to be supported.

From the foregoing description it will be apparent that the rotary body 20, through the agency of the sleeves 30 and 32 and the coaction of the surfaces thereof with the complementary surfaces on the hubs or protuberances 26, is accurately maintained in its proper position with respect to the arbor 10, irrespective of the fact that the aperture or hole 34 of the body is considerably larger than the diameter of the arbor. In fact, the hole in the rotary body may be considerably larger than the arbor without introducing any unsatisfactory results, and it should be understood that the conically shaped hubs 26 and the complementary surfaces on the sleeves may vary to a certain extent without affecting the purpose of precision and alinement of the arbor and the cutter. One pair of sleeves might in certain instances be sufficient to secure the rotary body in place, but if this single sleeve arrangement should constitute the inside sleeves 30, the pressure exerted between the surfaces 26a and 28a might be excessive, particularly in connection with cutters of smaller sizes. In fact, the pressure might be great enough to cause the shell or body 20 to burst. Therefore, I provide the second pair of sleeves 32 to encircle and grip the outside surface 26b of the hub to counteract the pressure of the inside cones. At least one pair of said cones are acted upon by spring pressure for clamping purposes. This clamping pressure serves to equalize the pressure when the parts are clamped together. I have employed springs such as the springs 36 having a tension corresponding to about half the pressure required for clamping the body in place through the agency of the inner sleeves 30. It will also be apparent that by employing the resilient means or dished washers 36, I eliminate the necessity of making both sets of sleeves exactly the same in length.

In Figure 4, I have shown a member denoted generally by the numeral 22b, which corresponds with the member 22 previously described, with the exception that the member 22b includes a body 20b having an annular recess 26b provided at each extremity thereof. The walls disposed on opposite sides of the V-shaped recess 26b serve the same purpose as the walls on the opposite sides of the protuberance 26 previously described. In other words, the invention contemplates the use of annular bearing surfaces provided on the body by employing either protuberances or by recessing the end surface of the body as shown in Figure 4. Obviously, when the structure of Figure 4 is employed, the sleeves 30 and 32 must be correspondingly changed to present complementary bearing surfaces.

In Figure 5 a further modification is disclosed wherein a member denoted generally by the numeral 22c includes a body 20c having recesses 26c provided at each end thereof. The recess 26c might be referred to as a chamfered area so as to present a single bearing surface, as distinguished from the oppositely disposed bearing surfaces presented by the protuberances 26 and the recesses 26b shown in Figure 4.

From the foregoing description it will be apparent that my invention contemplates the provision of a very simple and practical supporting device for bodies of revolution, such as rotary cutters and the like. As stated above, the diameters of the annular or conical bearing surfaces may vary within a given range without effecting the operativeness of the device. For example, the diameter of the conical section presented by the surfaces 26a being greater than shown in the drawing, satisfactorily cooperate with the complementary surfaces 28a on the sleeves 30. However, the conical surfaces must be concentric with the axis of the body of revolution. In other words, the accuracy with which the concentricity of the conical surfaces on the body 20 are formed will determine the accuracy with which said body may be mounted when in use. My invention precludes the necessity of forming bodies, such as cutter bodies 20 with an aperture arranged to accurately fit an arbor of predetermined diameter.

The invention is by no means limited to the specific arrangement of the keyways and keys 16 and 18, respectively, but contemplates other arrangements wherein these parts may be wider than the structures shown in the drawing. In other words, I contemplate using keys and keyways in both the arbor and rotary body, which are equal in width. Obviously, the specific arrangement of the protuberances or hubs 26, as well as the specific arrangement of the complementary surfaces which engage said hubs may be modified without departing from the spirit and scope of the present invention, said invention being limited only by the scope of the appended clams.

Having thus described my invention, what I claim as new and desire to secure by Letters Patent is:

1. In combination, an arbor adapted to rotate a tool, a tool adapted to be rotated by the arbor and having an inwardly and an outwardly slanted conical bearing surface at an end thereof and concentric with the tool, a sleeve about and movable longitudinally of the arbor and having an end surface concentric with the arbor for engaging one of said conical bearing surfaces on the tool, a second sleeve about the first sleeve and having an end surface concentric with the arbor for engaging the other of said conical bearing surfaces on the tool, and means for securing said sleeves in place.

2. In combination, an arbor adapted to rotate a tool, a tool adapted to be rotated by the arbor and having an inwardly and an outwardly slanted conical bearing surface at an end thereof and concentric with the tool, a sleeve about and movable longitudinally of the arbor and having an end surface concentric with the arbor for engaging one of said conical bearing surfaces on the tool, a second sleeve about and movable longitudinally of the first sleeve and having an end surface concentric with the arbor for engaging the other of said conical bearing surfaces on the tool, and means for holding the end surfaces of the sleeves against the respective conical surfaces on the tool.

3. In combination, an arbor adapted to rotate a tool, a tool adapted to be rotated by the arbor and having an inwardly and an outwardly slanted conical bearing surface at an end thereof and concentric with the tool, a sleeve about and movable longitudinally of the arbor and having an end surface concentric with the arbor for engaging one of said conical bearing surfaces on the tool, a second sleeve about and movable longitudinally of the first sleeve and having an end surface concentric with the arbor for engaging the other of said conical bearing surfaces on the tool, and means for pressing one sleeve rigidly with its end surface against one conical surface on the tool and for pressing the other sleeve yieldingly with its end surface against the other conical surface on the tool.

4. In combination, an arbor threaded at one end and adapted to rotate a tool, a tool adapted to be rotated by the arbor and having an inwardly and an outwardly slanted conical bearing surface at an end thereof and concentric with the tool, a sleeve about and movable longitudinally of the arbor and having an end surface concentric with the arbor for engaging one of said conical bearing surfaces on the tool, and a second sleeve about and movable longitudinally of the first sleeve and having an end surface concentric with the arbor for engaging the other of said conical bearing surfaces on the tool, a nut on the threaded end of the arbor and adapted to press one sleeve rigidly with its end surface against one of the conical surfaces on the tool, and a spring between the other sleeve and the nut whereby the second sleeve is simultaneously pressed yieldingly with its end surface against the other conical surface on the tool.

5. In combination, an arbor threaded at one end and adapted to rotate a tool, a tool adapted to be rotated by the arbor and having an annular projection at an end thereof, the projection having a conical inner face slanted outwardly and concentric with the tool, and an outer face slanted inwardly and concentric with the tool, a sleeve about and movable longitudinally of the arbor and having an end surface concentric with the arbor for engaging the inner face of said projection, a second sleeve about and movable longitudinally of the first sleeve and having an end surface concentric with the arbor and adapted for engaging the outer face of said projection, a nut on the threaded end of the arbor and adapted to press the inner sleeve rigidly with its end surface against the inner conical surface of the projection, and a spring between the outer sleeve and the nut whereby the outer sleeve is simultaneously pressed yieldingly with its end surface against the outer conical surface of the projection.

CARL G. OLSON.